Dec. 30, 1969   P. TOULIER   3,486,385
STARTER DRIVE ASSEMBLY
Filed April 25, 1968
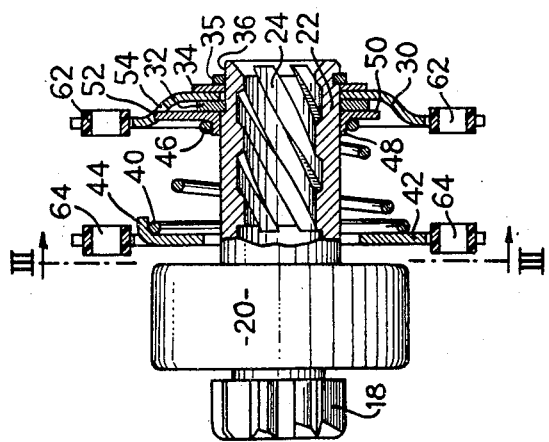
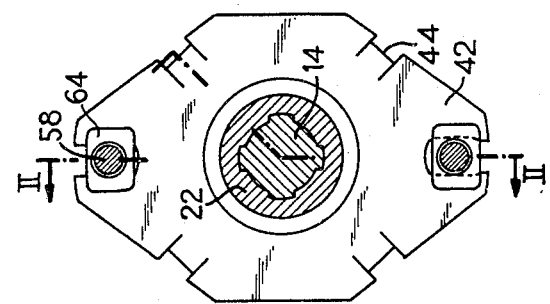
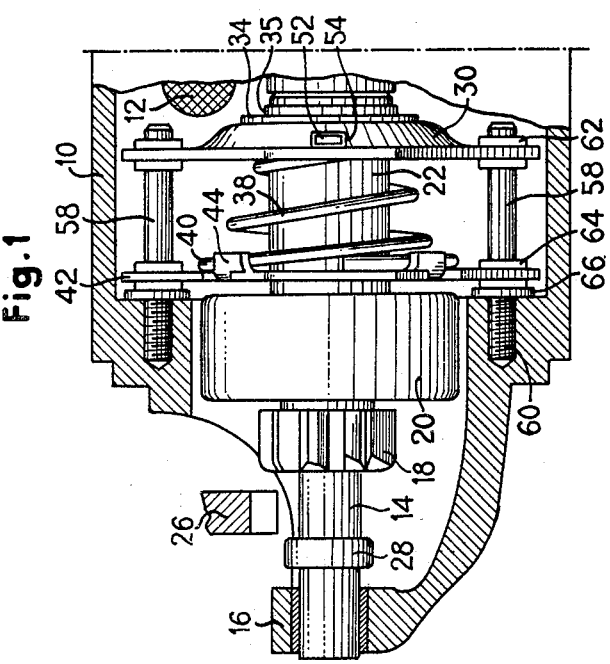

United States Patent Office 3,486,385
Patented Dec. 30, 1969

3,486,385
STARTER DRIVE ASSEMBLY
Pierre Toulier, Ville-d'Avray, France, assignor to Societe Anonyme, doing business as a company of France
Filed Apr. 25, 1968, Ser. No. 724,185
Claims priority, application France, Apr. 28, 1967, 104,622
Int. Cl. F02n 11/00
U.S. Cl. 74—7                            6 Claims

ABSTRACT OF THE DISCLOSURE

A starter drive in which the pinion adapted to mesh with a toothed wheel is connected by a free wheel with a sleeve member threaded on a driving shaft. A non-rotatable friction plate is squeezed between two friction washers driven in rotation by the sleeve member, whereby the friction torque thus generated opposes the free rotation of said sleeve member and causes the displacement of the pinion toward the toothed wheel against the thrust of a helical spring slipped on the sleeve member and compressed between the housing structure and one of said washers, the other washer abutting a snap ring fixed on said sleeve member. The improvement consists of an intermediary non rotatable ring provided between the helical spring and the washer adjacent thereto to prevent torsion of said spring.

---

It has already been proposed in my U.S. Patent 3,299,719 (same assignee) a starter drive for an internal combustion engine having a driving member which is mounted on and in threaded engagement with a driving shaft, said driving member being automatically advanced into driving engagement with a part of the engine as a result of said threaded engagement when it is retarded relatively to rotation of the driving shaft and a friction braking device acting on and retarding said driving member, wherein said friction braking device comprises friction plate means slipped on said driving member and non-rotatable therewith, said friction plate means being squeezed between two washers rotatably driven by said driving member and resiliently urged one toward the other and against a snap ring mounted on said driving member by resilient compression means coaxial to the latter.

In said starter drive the driving member comprises a sleeve member threaded on the driving shaft and a driving pinion provided to mesh with the toothed wheel of the engine to be started, said sleeve member and pinion being connected by a unidirectional clutch such as a free-wheel. The friction torque applied to the sleeve member by the aforesaid friction plate means has a value which is larger than that of the friction torque applied to the sleeve member in opposition by the unclutched unidirectional device when the internal combustion engine is started, the remaining differential torque being adapted to generate in co-operation with the threaded operative connection between the sleeve member and the shaft of the starting motor, an axial thrust toward said toothed wheel superior to the thrust exerted in the opposite direction by sadi resilient returning means.

In the above starter drive the resilient compression means coaxial to the driving member and urging the washers one toward the other consist of a helical spring the last turn of which is directly applied against the washer adjacent to said last turn. The helical spring is thus subjected to a torsion torque and there exists risk that the load applied to the last turn be uneven resulting in a variation of the friction forces between the washers and the friction plate and a modification of the strength of the spring itself.

To avoid the above drawbacks and thereby improve the operation of the starter drive the invention provides an intermediary non-rotatable ring located between the said helical spring and the washer adjacent to the latter to avoid the torsion of the spring.

According to another feature of the invention said intermediary ring is provided with a tubular extension, coaxial with the sleeve member on which is slipped the last turn of the helical spring.

In a preferred embodiment, the helical spring is frusto-conical the latter turn thereof being retained by bent lugs solid with a fixed abutment plate whereas the smaller turn is slipped on said tubular extension of the intermediary ring.

Other characterizing features of the invention will appear in the following specification in which reference is made to the accompanying drawings in which:

FIGURE 1 shows, mounted in the body of a starting motor, the starter drive assembly of this latter provided with the improvements of the present invention.

FIGURE 2 is an axial cross sectional view for the starter drive assembly of FIGURE 1.

FIGURE 3 is a cross-sectional view taken along line III—III of FIGURE 1.

When considering more specially FIGURE 1, which shows with parts broken away a starting motor according to the invention it may be seen a stator (not shown) integral with the body 10 of a starting motor in which is rotatably mounted a rotor 12. Shaft 14 of rotor 12 is received in two bearings one of which only (bearing 16) is shown on the drawing.

Between rotor 12 and bearing 16 is mounted a starter drive assembly (also shown in longitudinal cross section on FIGURE 2) which comprises: a pinion 18, a free wheel or unidirectional clutch 20 and a sleeve member 22.

Pinion 18 is integral with the driven portion of the free-wheel 20. Sleeve member 22 is integral with the driving portion of free-wheel 20 and comprises on its internal wall helical splines 24 cooperating with mating splines carried by shaft 14. Upon displacement of the starter drive as a result of the threaded engagement of sleeve member 22 and shaft 14 (toward the left when considering FIGURE 1), pinion 18 meshes with the toothed wheel 26 of the internal combustion engine to be started. At the end of such a displacement, pinion 18 is in abutment against a ring 28 secured to shaft 14.

As described in detail in the above mentioned patent, the friction force causing the sleeve member 24 to advance is applied to said sleeve member by means of a friction plate 30 through which extends said sleeve member. The opposed surfaces of plate 30 cooperate with two washers 32–34 driven in rotation with said sleeve member. For this purpose, washers 32 and 34 have their central opening cooperating with a flat 36 provided on the sleeve member.

Washers 32 and 34 are squeezed against the opposed surfaces of friction plate 30 by a compression spring 38 (of frusto-conical shape in the shown embodiment), washer, 34 being in abutment against a snap ring 35 secured to sleeve member 22. Spring 38 takes support by its first turn 40 against an abutment plate or transverse part 42 fixed with respect to body 10 of the starting motor. Turn 40 is maintained centered on part 42 by means of bent lugs 44. The last turn 46 is slipped on a tubular extension 48 of a bearing ring 50 which is applied against washer 32. At least one radial extension 52 is provided at the periphery of ring 50 to be inserted into a slot 54 provided in the wall of plate 30 which, as shown, is made in the form of a cup, the recessed portion of which is adapted to receive washer 32 and bearing ring 50. In FIGURE 2, the starter drive assembly proper is shown dismounted from the starting motor. The mounting of the starter drive assembly in the starting motor is effected on two pins 58, secured to the body of the starting motor by their threaded ends 60. The friction plate 30 and transversal part 42 are slipped on said pins 58 with the interposition of annular sliding elements 62 and 64 respectively. Sliding elements 62 and 64 are made of plastic material and resiliently received by radial slots diametrally opposed on the friction plate and on the transversal part.

As better shown in FIGURE 1, in its released condition, the starter drive assembly is maintained on pins 58 spring 38 being slightly compressed between transversal part 42 (which bears by its sliding means 64 on flanged portion 66 carried by pins 58) and the shoulder of the rotor shaft through the intermediary of the stack constituted by bearing ring 50, washer 32, plate 30, washer 34, snap ring 35, collar of the sleeve member 22. It is obvious that the improvement described hereinabove i.e. the guiding of spring 38 on the transversal part 42 and interposition of bearing ring 50 between spring 38 and washer 32 permits maintaining the spring 38 accurately concentric with respect to sleeve member 22 thus avoiding the torsion of said spring since said washer 32 driven in rotation by the sleeve member can no longer transmit this rotation to ring 50 which cannot rotate because of its radial extensions 52 located in the slots 54 of friction plate 30. The use of sliding means 62 and 64 also provides an improvement thanks to which the starter drive has a perfect behaviour when submitted to vibrations.

I claim:
1. A starter drive assembly comprising in combination:
   a housing;
   a pinion adapted for engagement with a toothed wheel;
   a sleeve member adapted for engagement with a rotatable threaded shaft;
   a free wheel operative to interconnect said sleeve member and said pinion;
   a plurality of friction washer means interconnecting said housing and said sleeve member and operative to apply a rotation retarding force to said sleeve member;
   a spring means interconnecting said housing and said friction washer means operative to apply a compressive force to said friction washer means; and
   a non-rotatable intermediary ring interposed between said spring means and said plurality of friction washer means whereby rotation of the friction washer means is prevented from applying a torsion to said spring means.

2. The starter drive as claimed in claim 1 wherein said intermediary ring includes at least one radial extension cooperating with a non-rotatable one of said plurality of friction washer means with a view to preventing rotation of said ring.

3. The starter drive as claimed in claim 2 wherein said spring means comprise a helical spring and said intermediary ring includes a tubular extension co-axial with said sleeve member, the last turn of the helical spring being received on said extension.

4. The starter drive as claimed in claim 3 wherein one of said plurality of friction washer means comprises a recessed cup-shaped portion, the central portion of which is squeezed between others of said plurality of friction washer means and the edge wall of which is provided with a slot for receiving said intermediary ring radial extension.

5. The starter drive as claimed in claim 4 wherein said one friction washer means is slidable mounted on guiding pins which are parallel to said sleeve member and integral with said housing.

6. The starter drive as claimed in claim 5 wherein annular members of plastic material are between said one said friction washer means and said guiding pins to improve the sliding motion of the one friction washer means on said pins.

References Cited
UNITED STATES PATENTS 3,182,515  5/1965  Klein _____ 74—7
3,399,575  9/1968  Seilly et al. _____ 74—7

MILTON KAUFMAN, Primary Examiner